United States Patent [19]
Tanaka et al.

[11] 4,292,491
[45] Sep. 29, 1981

[54] WIRE ELECTRODE ELECTRIC DISCHARGE MACHINE WITH CONTROLLED ELECTRICAL PARAMETERS

[75] Inventors: Yutaka Tanaka; Takeshi Yatomi, both of Nagoya, Japan

[73] Assignee: Mitsubishi Denki Kabushiki Kaisha, Tokyo, Japan

[21] Appl. No.: 66,313

[22] Filed: Aug. 14, 1979

[30] Foreign Application Priority Data

Aug. 16, 1978 [JP] Japan .................................. 53-99843
Nov. 2, 1978 [JP] Japan .................................. 53-135552

[51] Int. Cl.³ ............................................. B23P 1/02
[52] U.S. Cl. ............................................. 219/69 W
[58] Field of Search ................ 219/69 W, 69 P, 69 G, 219/69 C

[56] References Cited

U.S. PATENT DOCUMENTS

4,052,583 10/1977 Inoue ............................. 219/69 W

Primary Examiner—C. C. Shaw
Attorney, Agent, or Firm—Oblon, Fisher, Spivak, McClelland & Maier

[57] ABSTRACT

In an electric discharge machine, a pulse voltage is applied between a wire electrode and a workpiece to cause electric discharge between said wire electrode and said workpiece in a work liquid, and said workpiece is moved to said wire electrode depending upon the configuration of said workpiece and the degree of said electric discharge work to obtain a desired configuration. The movement of said workpiece can be controlled depending upon the speed signal corresponding to a gap voltage and the degree of the signal. The size of the work area is detected by the speed signal and a sharp corner work is carried out under a low energy by controlling the power source and the thickness variation work is carried out by increasing the energy in the case that the work area is increased and by decreasing the energy in the case that the work area is decreased.

12 Claims, 15 Drawing Figures

| 0 | 4 — 8 — 1 |
|---|---|
| 1 | 4 — 8 — 3 |
| 2 | 4 — 6 — 5 |
| 3 | 4 — 4 — 8 |
| ⋮ | ⋮  ⋮  ⋮ |
| n | $I_P$ — $\tau_P$ — $\tau_r$ |

WIRE ELECTRODE ELECTRIC DISCHARGE MACHINE WITH CONTROLLED ELECTRICAL PARAMETERS

BACKGROUND OF THE INVENTION

1. Field of the Invention

The present invention relates to an electric discharge machine in which a wire electrode is used as an electrode and which is suitable for electric discharge machining to vary a work area of a workpiece during the work.

2. Description of the Prior Art

The wire cut electric discharge machine controls an electric condition in the best condition depending upon variation of a thickness of a workpiece.

In the wire cut electric discharge machine, a metallic wire having a diameter of about 0.05 to 0.3 mm is used as an electrode to cause the relative movement in X-axis and Y-axis directions to the workpiece whereby the processing of cutting and boring in a desired configuration is carried out.

The relative movement is usually a stepped constant feed having the order of 1 μm per pulse in the electric discharge whereby the electric discharge having a constant voltage is performed in a working gap without controlling an electric discharge energy. When a thickness of the workpiece is constant, the work can be carried out as desired, even though it is the constant feed. However, when a thickness of the workpiece is not constant, the work is firstly carried out with the feed speed set for the maximum thickness (maximum processing area) in order to prevent the trouble of shortcircuiting or wire cutting and accordingly, even though a thickness of the workpiece is reduced during the work, the electrode is fed at the initially set slow speed and the work efficiency is low.

Even though a thickness of the workpiece is constant, when the workpiece is processed in a configuration having a corner part, the corner is rounded and a sharp corner can not be disadvantageously given.

It has been proposed to control the work feed speed by detecting a voltage in the work gap, i.e. the work voltage in order to overcome the constant feed speed work. This is superior to the constant feed speed work, however, this does not attain satisfactory effect.

SUMMARY OF THE INVENTION

It is a main object of the present invention to provide an electric discharge machine having high work efficiency.

It is another object of the present invention to provide an electric discharge machine whose work efficiency is superior to that of the conventional one even though the thickness of the workpiece is varied or the angle of the work direction is varied or the work area is varied during the work.

The foregoing and other objects of the present invention have been attained by providing an electric discharge machine in which the electric discharge is formed between a wire electrode and a workpiece in a work liquid by applying voltage between them and the wire electrode and the workpiece are relatively moved to carry out a desired work, and which comprises means for detecting a gap voltage between the wire electrode and the workpiece; a first comparator which compares the gap voltage detected by said detecting means with the reference voltage to generate a differential signal for the difference of the voltages; a converter which receives the output of the first comparator to generate a speed signal used for speed control of the relative movement between the wire electrode and the workpiece; and a second comparator which compares the speed signal corresponding to the reference work area with the speed signal as the output of the converter, whereby a circuit constant of a power device for applying the voltage between the wire electrode and the workpiece is controllable and when the speed signal as the output of the converter is smaller than a predetermined speed signal, the circuit constant of the power device is controlled to increase through an electric condition control circuit depending upon the output of the second comparator, and when the work area is decreased, it is controlled to decrease the power of the power device whereas when the work area is increased, it is controlled to increase the power of the power device.

DESCRIPTION OF PREFERRED EMBODIMENTS

Referring to FIGS. 1 to 8 and FIG. 14, the conventional electric discharge machine will be illustrated.

Firstly, the conventional operation for changing the work direction for certain angle during the work will be illustrated referring to FIGS. 1 to 5.

Figure 1:
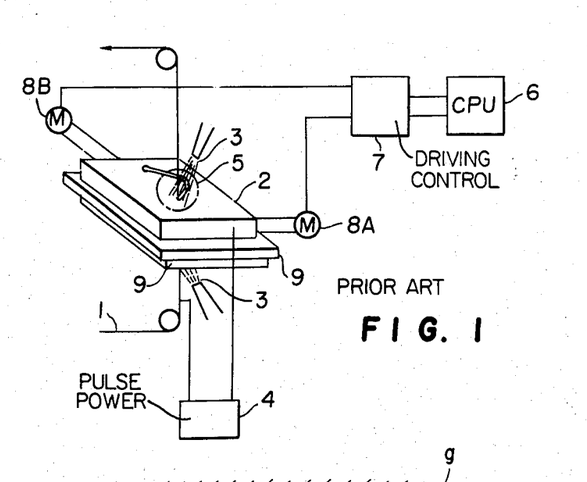
FIG. 1 is a schematic view of a wire cut electric discharge machine.

In a wire cut electric discharge machine, a wire having a diameter of 0.5–0.3 mm is usually used as a wire electrode (1) and the wire electrode (1) is placed to form a fine gap to a workpiece (2) and a pulse voltage fed from a power device for work is applied to the gap during feeding a work liquid (3) whereby an electric discharge is continuously repeated to perform the work.

The feeding command and the feed speed at the work part (5) are decided by a driving control device (7) connected by the on-line to a computer (6), and X-axis and Y-axis motors (8A), (8B) are controlled to move an X-Y cross table (9) in a desired feed pattern.

The problems in the conventional electric discharge machine will be illustrated.

Figure 2:
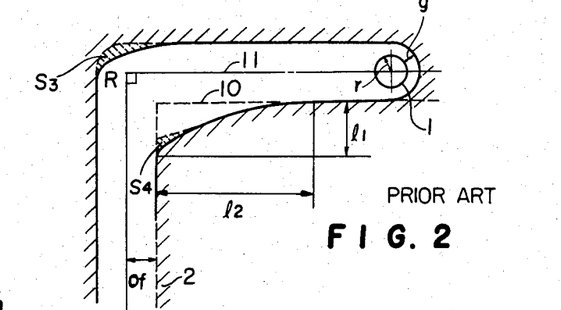
FIG. 2 shows defects caused by varying a work direction in the conventional electric discharge work.

FIG. 2 shows an example for changing the direction of a program locus (10) by 90 degrees. The wire electrode (1) is fed in a wire locus (11) which is shifted from the program locus (10) for the off-set Of($=r+g$) of the sum of a radius r of the wire electrode and a discharge gap (g). However, when such work is carried out, it is not fed along the program locus (10) at the corner shown in FIG. 2, but it causes "deviation" in the range of $l_1$, $l_2$ and accordingly it is difficult to obtain a precise processed workpiece along the program locus (10).

The deviation at the corner is usually in ranges of $l_1=20-50$ mm and $l_2=0.2-0.3$ mm. The deviation causes an undesired configuration and also causes an enlarged clearance between a punch and a die for a press machine at the corner which causes a bur in a molding. It is difficult to prepare a precise mold having fine clearance as fine blanking. In view of total accuracy, it is difficult to maintain a desired clearance between the punch and the die with the result that the value of the resulting mold is decreased. The reason for the formation of the deviation will be illustrated.

Figure 3A:
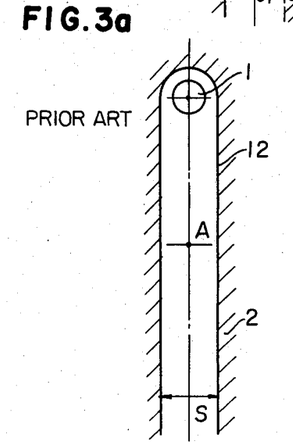
FIGS. 3, 4 and 5 respectively show phenomena of defects in the conventional electric discharge work.

When a work groove (12) having a width S is formed as shown in FIG. 3(a) and the wire electrode (1) is returned to the position A and the wire electrode (1) is fed to the position B under the work, the deviation is caused in ranges of $l_3$ and $l_4$ because the new work of the wire electrode (1) to the work groove (12) is started.

Figure 3B:
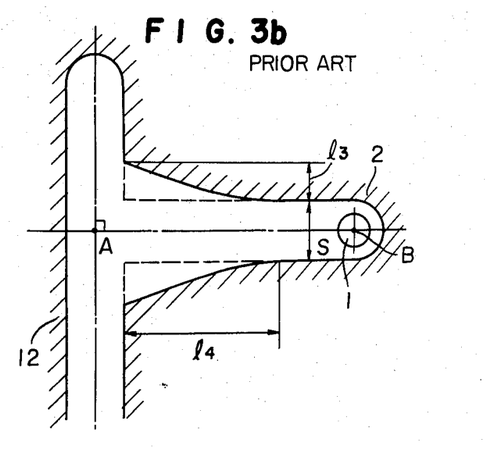

When the new work of the wire electrode to the workpiece is started as shown in FIG. 3(b), the wire electrode causes vibration by an electric discharge repulsive force caused by a gas explosion etc. at the start of the electric discharge and accordingly, excess work is caused. Even though the wire electrode is put deeply into the workpiece, a width of the processed groove is enlarged by increasing frequency of the electric discharge, since the work tips are removed near the front surface of the workpiece. As a result, it is necessary to have a specific distance from the front surface until resulting the normal work condition for forming the processed groove having a constant width S as shown in FIG. 3(a).

The distances are varied depending upon a feed speed, a thickness of the workpiece etc. In the light of experiments, it is found that $l_3=20-40$ μm; $l_4=0.2-0.3$ mm.

Figure 4:
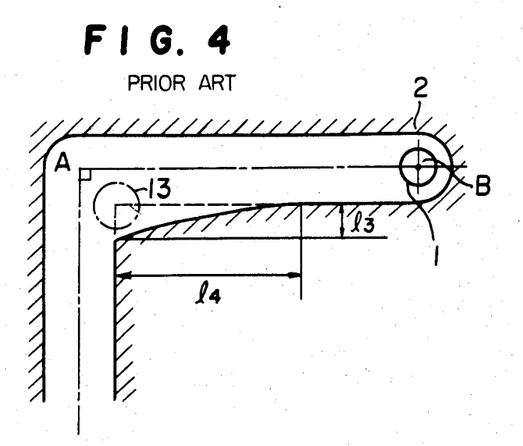

The case of FIG. 4 will be illustrated.

In the case of FIG. 3(b), the degree of freedom of the wire electrode (1) is 2 at the position A. (right and left direction). In the case of FIG. 4, the degree of freedom is 1 and accordingly, it is considered to cause the deviation in the ranges of $l_3$ and $l_4$ (the same as $l_3$ and $l_4$ of FIG. 3(b)).

Figure 5A:
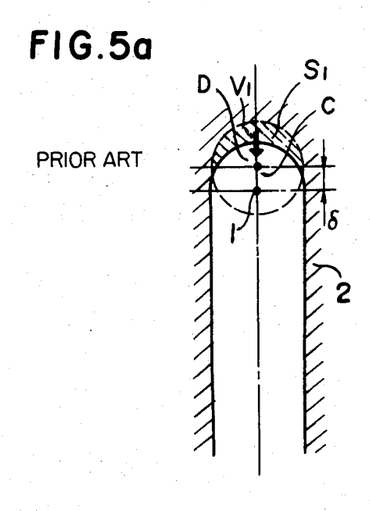
Figure 5B:
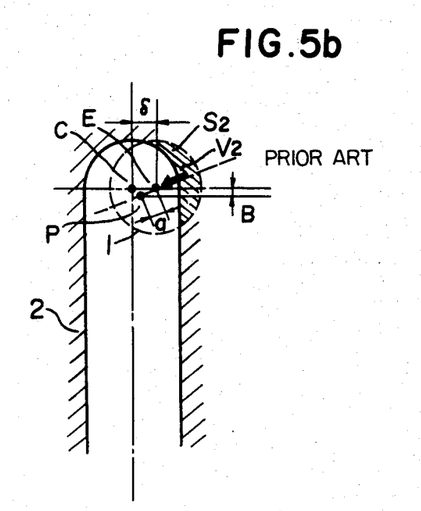

The difference between FIG. 4 and FIG. 3(b) is illustrated referring to FIG. 5. As shown in FIG. 5(a), when the wire electrode (1) moves from the point C to the point D for a distance δ, the wire electrode (1) receives a force for composite vector $V_1$ of the electric discharge repulsive force depending upon the new electric discharge area $S_1$ to the $\overrightarrow{DC}$ direction. When the wire electrode (1) moves from C to E for the distance δ as shown in FIG. 5(b), (change of direction by 90 degrees), the composite vector $V_2$ for the new electric discharge area $S_2$ is not applied to $\overrightarrow{EC}$ direction but is applied to $\overrightarrow{EP}$ direction and the bending of the wire for α is caused. As a result, it is shifted by β in the direction perpendicular to the $\overrightarrow{CE}$. The vibration caused by the shift results in excess work, and the work for the deviation is caused at the corner (13) in FIG. 4.

The parts $S_3$, $S_4$ shown in FIG. 2 form undesired processed parts caused by bending the wire electrode at the corner in FIG. 5(b). The part $S_3$ is remained without processing because of the deviation of the wire locus (11) caused by the bending of the wire electrode. The part $S_4$ is excessively processed by said bending. Therefore, the distances $l_3$ and $l_4$ in FIG. 4 correspond to $l_1$ and $l_2$ in FIG. 2. The serious problem in the wire cut electric discharge machine is caused by the deviation in the ranges of $l_1$ and $l_2$ in FIG. 2.

As it is illustrated in principle, the deviation is caused by the vibration and bending of the wire electrode.

Referring to FIGS. 6 to 8 and FIG. 14, the problem of the conventional technology in the case of varying a thickness of the workpiece during the work will be illustrated.

Figure 6:
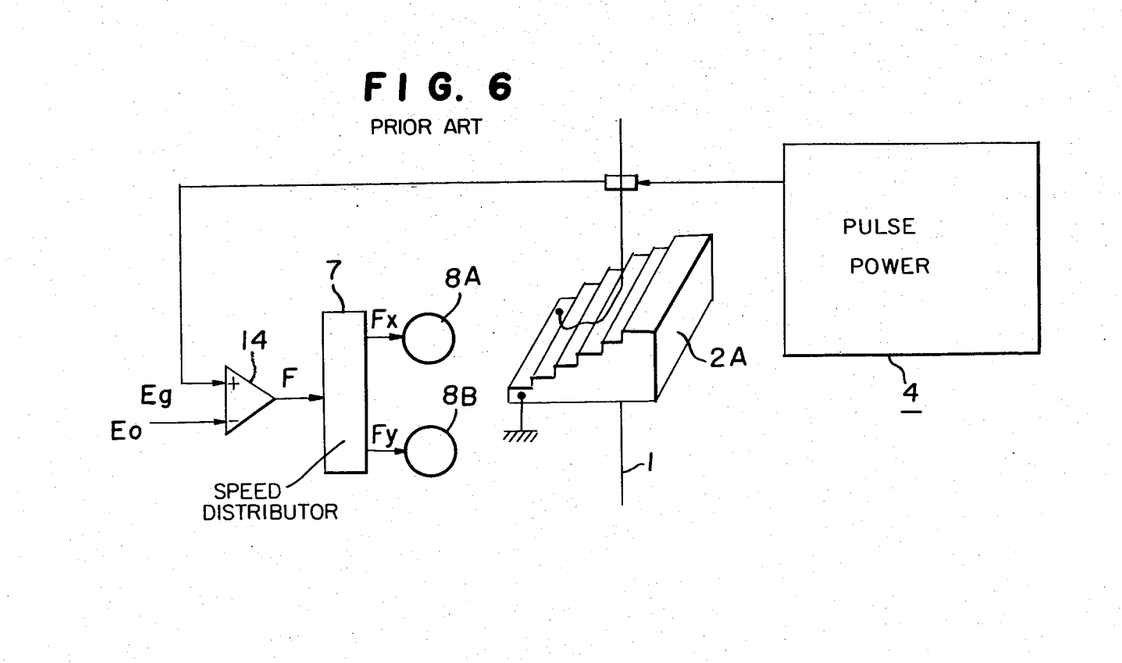
FIG. 6 is a schematic view of the conventional electric discharge machine in a case of varying a thickness of a workpiece.

In FIG. 6, a work current is fed from the power device such as a pulse power device (4) between the wire electrode (1) and the workpiece (2A).

An average work voltage Eg and the reference voltage Eo are input into an error amplifier (14) to decide the work feed speed F being proportional to a differential voltage as the difference between the average work voltage Eg and the reference voltage Eo. The work feed speed F is allotted to X-axis component Fx and Y-axis component Fy by a speed distributor (7) whereby the X-axis motor (8A) and the Y-axis motor (8B) are driven.

The output F of the error amplifier (14) and the outputs Fx, Fy of the speed distributor (7) have the following relation.

$$Fx^2+Fy^2=F^2$$

In such a structure, the gap between the wire electrode (1) and the workpiece (2) can be decreased. When the work voltage Eg is lower than the reference voltage Eo, the work feed speed F is decreased whereby the gap is enlarged to approach the work voltage Eg to the reference voltage Eo. On the contrary, when the work voltage Eg is higher than the reference voltage Eo, the work feed speed F is increased to approach the work voltage Eg to the reference voltage Eo.

In the feature of feed-back of the work voltage to vary the work feed speed, when a thin part of the workpiece (2A) is processed, the work feed speed is faster whereas when a thick part is processed, the work feed speed is slower so as to give a substantially constant work area speed.

Figure 7:
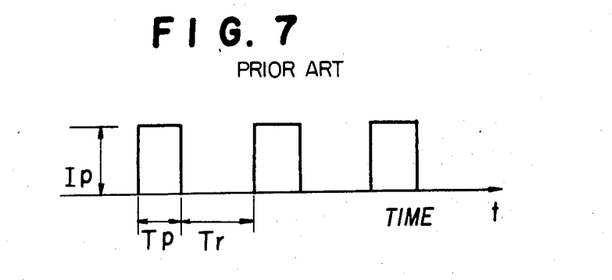
FIG. 7 is a diagram of a current pulse waveform in a power device for the electric discharge machine.

When the work feed speed is controlled by adjusting the work voltage to the reference voltage, the work feed speed loss found in the normal feeding process can be substantially decreased. FIG. 7 shows a current wave form for charging the capacitor for charging and discharging. The peak current $I_p$, the pulse width $T_p$, quiescent width $T_r$ of the pulse current for charging are considered as settable factors.

Figure 8:
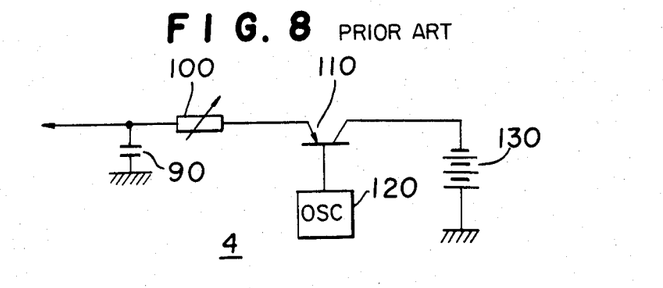
FIG. 8 is a circuit diagram of the power device for the electric discharge machine.

FIG. 8 shows the detail of the power device (4) shown in FIG. 1. The reference numeral (90) designates a capacitor for affecting the roughness of a processed surface; (100) designates a current control resistor for deciding the peak current $I_p$ and (110) designates a switching transistor; (120) designates an oscillator. The pulse width $T_p$ and the quiescent width $T_r$ are decided by them. The reference numeral (130) designates an inner DC power device. The energy of the electric discharge work is remarkably different depending upon these set conditions even though the average work voltage Eg is the same.

When a thin workpiece is processed, a concentrated electric discharge is easily caused. Therefore, the wire electrode (1) may be cut if the energy for the work is not reduced by decreasing these electric conditions.

When the work feed speed is controlled to give a constant work voltage Eg in the work of a workpiece whose thickness is varied, the electric condition as the work energy is set so as to prevent the cutting of the wire electrode (1) at the part having the thinner thickness. Therefore, the electric condition is too low at the thick part of the workpiece and the work speed is too low. In view of accuracy, it is preferable to increase the electric condition at the thick part of the workpiece. When the configuration of the workpiece has an edge, it is similar to that of the substantially reduced thickness of the plate. In said case, a sharp edge can be formed by decreasing the electric condition. Thus, in the conventional process for the constant feed speed control or the conventional process for the control of the work feed speed while maintaining a constant work voltage, a desired work speed and a desired accuracy can not be obtained and the set of the electric condition should be manually performed, this requiring long experience. The set is not easy and the wire electrode (1) is sometimes cut and the reliability of the work is too low.

Figure 9:
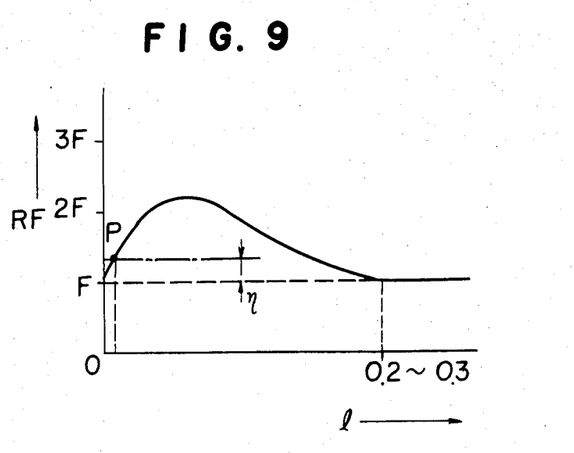
FIG. 9 is a graph for illustrating the principle of detection at a corner.
Figure 10:
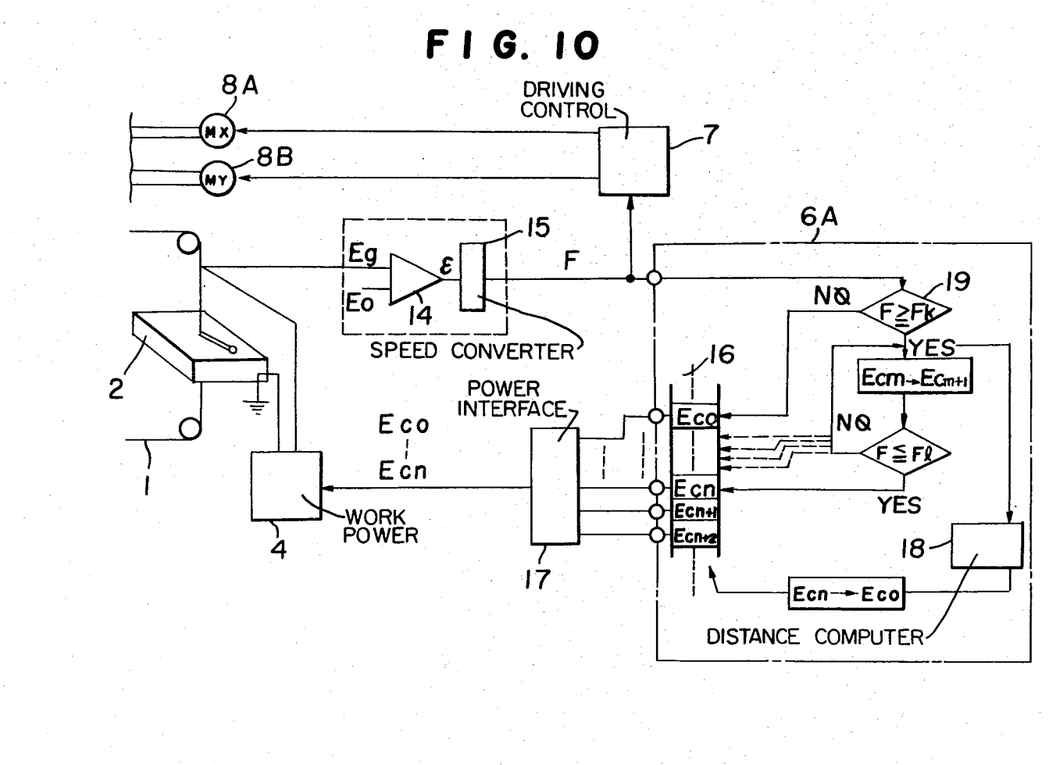
FIG. 10 is a diagram for showing a principle of operation and a system of one embodiment of the present invention.
Figure 11A:
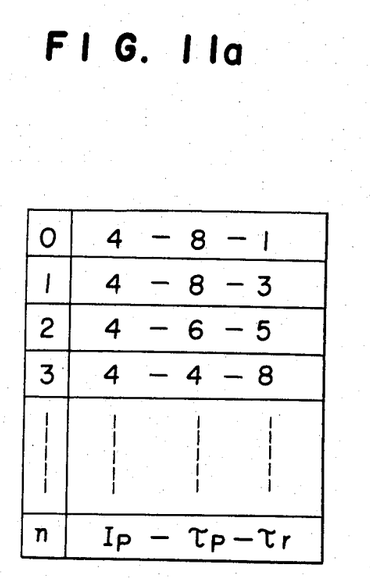
FIGS. 11(a), (b) show one example of a table of electric conditions memorized in a computer.
Figure 11B:
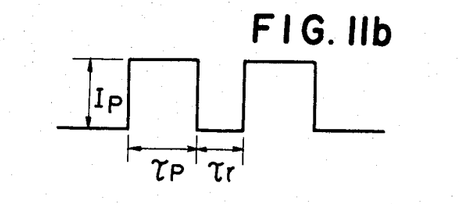

The embodiment of the present invention will be illustrated, referring to FIGS. 9 to 11. The problem found in the conventional one shown in FIGS. 1 to 5 can be overcome by the embodiment.

FIG. 9 is a graph wherein a ratio RF of the work speed in the work for corner part to the work speed F for a straight part is given on ordinate and the distance l from the part bending at the corner R shown in FIG. 2 is given on the abscissas.

As shown in FIG. 9, in the table feed control for constant voltage or current at the corner part, the work speed F is raised for about 0.2–0.3 mm in a section. This corresponds to a decrease of the thickness in equivalent at the corner as shown in FIG. 5 (the electric discharge area is reduced as $S_1 > S_2$ as shown in FIG. 5). When the work condition (electric discharge energy) is constant and the electric discharge area is reduced, the work speed F is raised. Therefore, it is possible to find the corner part at the point p by setting the level of $F + \eta$ as shown in FIG. 9. That is, the corner part can be automatically detected from the raising of the work speed F. The level $F + \eta$ is a higher level than the speed variable level in the work.

Referring to FIG. 10, the structure and principle of the operation of the present invention will be illustrated.

The average gap voltage Eg in the work is compared with the reference voltage Eo by a known comparator (14). The voltage $\epsilon$ being proportional to the difference is input into the speed converter (15) to output the work speed F for constant voltage and current. As a result, the X-axis motor and Y-axis motor (8) are driven by the driving control device (7) whereby the workpiece (2) is moved to the X-axis direction by the X-axis motor (8A) and to the Y-axis direction by the Y-axis motor (8B) in the work. The work speed F is converted into a digital signal which is fed into the computer (6A). In the computer (6A), the electric condition data (16) are memorized as the digital table. The electric condition data (16) are combinations of the electric conditions of . . . Eco . . . Ecr, the work speed is given at a higher speed in the upper position than that of the lower position when the work is carried out in said electric condition. The weighing is given by the indication of the work speed. The electric conditions for higher work speed are arranged from the upper part to the lower part.

As shown in FIG. 9, the process for varying the electric condition EC after discriminating the corner part (p point in FIG. 9) by the increase of the work speed F will be illustrated.

In the consideration of the case of the work in the electric condition Eco at the work speed F, this is the normal straight work and accordingly, the speed will not over $F + \eta$ shown in FIG. 9. The work speed value given into the computer (6A) as the digital value is not over the corner detection level Fk ($F + \eta$ in FIG. 9) of FIG. 10. As shown in the flow chart, $F \geq Fk$ is NO so that the present electric condition Eco is maintained. The electric condition Eco is input into the computer (6A) by selection from the other table similar to the table of the electric condition data (16) by an operator at the initial stage. When the work reaches the corner part, the work speed is raised and $F \geq Fk$ is Yes as shown in the inner flow chart of the computer (6A) in FIG. 7. The number of the electric condition data (16) is increased by one as shown by the equation Ecm $\rightarrow$ Ecn+1.

in such a case, Eco is changed to Ecl and the electric condition makes the decrease of the energy by one step to the direction for reducing the work speed by the characteristics of the electric condition. The command is transmitted to the work power device (4) by a power interface (17) corresponding to the electric condition data (16) whereby the electric discharge pulse is varied. As a result, the practical work speed is decreasing. At the corner part, the area is small. In such a decrease of the electric condition, the work speed is not varied to reduce it but is maintained at a level of higher than Fk.

Therefore, the condition $F \geq Fk$ is Yes to decrease further the electric condition. When the work speed is decreased to lower than the predetermined lower limit level Fl ($F \geq Fl$ is Yes), the operation for repeating the further reduction of the electric condition is stopped to maintain the electric condition Ecn at the time for lowering it than Fl. The lower limit level Fl is preferably a lower value than the value being lower than F. (about 0.6–0.8F) and it is different to control the increase of F in FIG. 9.

The corner part is detected ($CF \geq Fk$ is Yes) and the value Ecn is forcibly increased for each step at the time passing a constant period which is counted by the distance computor (18). The value is returned to Eco at the time of the initial straight change work. Therefore, the electric condition is decreased for a specific section after discriminating after finding it at the corner, whereby the work speed is decreased below the lower limit level. After the period, the electric condition is returned back to perform the work on the straight surface.

The specific numbers of the steps are given for the electric condition data (16) addressing from the head. The work speed condition is faster in the upper part, and the work speed condition is lower in the lower part. One embodiment is shown in FIG. 11(a). The electric condition is shown by $I_p - \tau_p - \tau_r$ (pulse height-pulse width-quiescent period) (See FIG. 11(b)). These correspond to notches of the work power device. The values of the electric condition data are decided depending upon the practical work speeds by experiments with experience.

As described above, the deviation caused by the vibration of the wire electrode etc. shown in FIG. 4 can be decreased by decreasing the work speed under decreasing the electric condition. That is, the composite electric discharge repulsive force can be decreased by a control such as a decrease of the frequency in the electric discharge. The bending of the wire electrode shown in FIG. 5(b) is also decreased so that the work areas in inaccuracy such as $S_3$ and $S_4$ shown in FIG. 2 are decreased. As a result, the distances $l_1$ and $l_2$ shown in FIG. 2 are decreased. In accordance with the experiment, it is possible to decrease them to be $l_1 = 5-10$ $\mu$m and $l_2 = 5-10$ $\mu$m. The high accuracy required for a precise mold having a corner part in high accuracy can be obtained. Moreover, the work at the corner is automatically detected and the electric condition can be controlled by a specific control system and the deviation can be prevented.

The control of the electric conditions may be commanded by an N/C table etc. However, such control of the electric conditions should be made depending upon experience factors and it is different depending upon the angle at the corner (obtuse angle and acute angle). Therefore, it is quite difficult to control it by the N/C table.

In accordance with the present invention, the electric condition is sequencially decreased by the electric condition data to give a specific work speed. Therefore, there is no difficulty and the electric condition is automatically fixed, when the specific work speed is given.

Even in the case of the constant feed speed system for maintaining a constant relative feed speed between the workpiece and the electrode, the control of the present invention can be applied by detecting the voltage or the current, for example, detecting the increase of the gap voltage Eg over the set level, to input the data into the computer by substituting the work speed E by the gap voltage Eg.

In accordance with the embodiment of the present invention shown in FIGS. 9 to 11, a workpiece having a corner is processed depending upon the program and the work reaching to the corner is detected by detecting means and the electric condition is sequencially varied so as to give a specific condition of the work speed and the work condition depending upon the electric condition data memorized in the computer, whereby the deviation at the corner can be prevented. The advantages of the present invention are remarkable.

Figure 12:
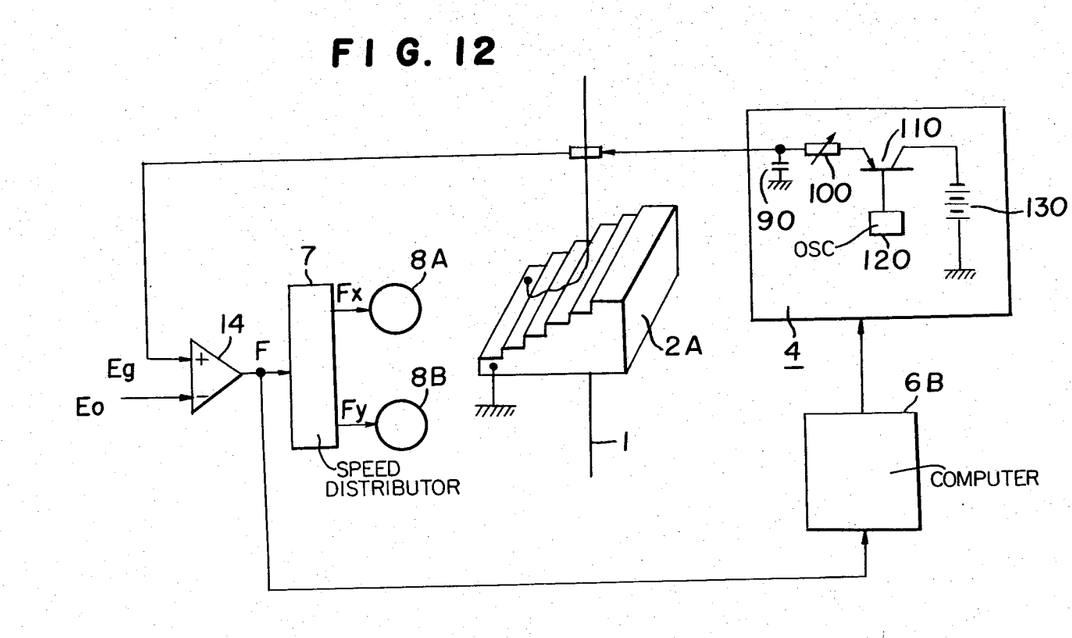
FIG. 12 is a schematic view of the other embodiment of the present invention.
Figure 13:
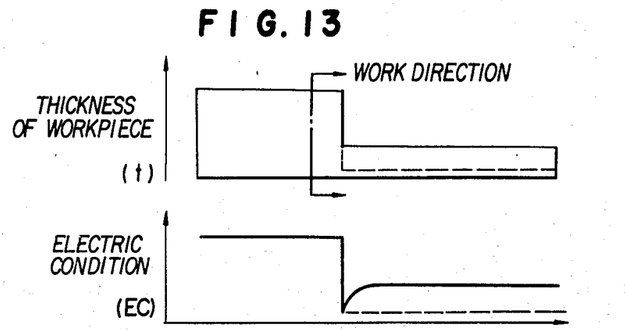
FIG. 13 is a diagram for illustrating the operation of the embodiment shown in FIG. 12.
Figure 15:
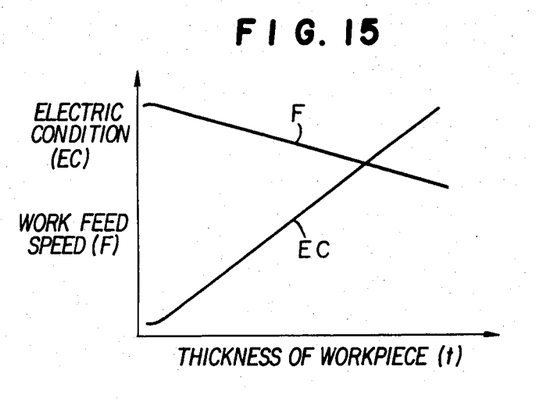
FIG. 15 is a graph showing a relation between a feed speed and a thickness of the workpiece in the embodiment shown in FIG. 12.

The other embodiment of the present invention will be illustrated referring to FIGS. 12, 13 and 15. The problems in the conventional technology can be overcome by such embodiment.

FIG. 12 shows the other embodiment of the present invention. As the same with that of FIG. 6, the work voltage Eg is always compared with the reference voltage Eo and the work feed speed F is varied so as to approach the work voltage Eg to the reference voltage Eo.

The case of accomplishing the work for a constant thickness of the workpiece (2A) and starting the work for a thicker part of the workpiece in said structure will be considered.

When the work feed is controlled to maintain the constant gap voltage even in the thicker part of the workpiece, and the electric condition is not changed, the work energy is substantially constant and the work area speed is substantially constant and accordingly the work feed speed is slow down in inverse proportion to the thickness of the workpiece.

The work feed speed F is input into the computer (6B), whereby the decrease of the work feed speed F is detected as the increase of the thickness whereby the electric condition is gradually increased. When the electric condition is increased, the work energy is increased and the work feed speed is relatively increased. The work feed speed can not be increased to the original level in order to prevent the wire cut.

Figure 14:
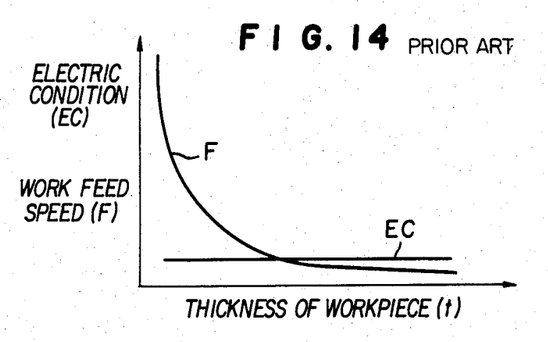
FIG. 14 is a graph showing a relation between a feed speed and a thickness of the workpiece in the conventional machine shown in FIG. 6.

FIG. 14 shows the relation of the thickness t of the workpiece and the work feed speed F when the electric condition (work energy) EC is set for the part of the thinnest thickness t so as to prevent the wire cut in the conventional machine. The electric dondition is constant whereby the work feed speed F is decreased in inverse proportion to the thickness t of the workpiece.

FIG. 15 shows the relation of the thickness t of the workpiece and the work feed speed F in the machine of the present invention wherein the electric condition is automatically set by the computer. Even though the thickness t of the workpiece is increased, the electric condition is increased whereby the work feed speed F is not decreased so much as shown in FIG. 15.

When the data of the work feed speed F are input into the computer (6B) in the embodiment of FIG. 12, the electric condition EC is decided depending upon the data of the graph of FIG. 15 in the memory of the computer (6B).

When the electric condition EC corresponding to the present work feed speed F obtained from the graph is higher, the computer (6B) commands to the power device (4) so as to gradually increase the electric condition, whereby the present work feed speed finally corresponds to the output electric condition EC.

When a thickness of the workpiece is increased, the computer (6B) shown in FIG. 12 command so as to gradually decrease the electric condition EC.

When the thickness of the workpiece is decreased in step, the command of the computer (6B) for setting the electric condition may delay to the practical requirement whereby the wire electrode (1) is cut.

In this embodiment of the present invention, when the increase of the work feed speed is detected, the electric condition EC is suddenly decreased to the minimum for the work of the minimum thickness of the workpiece and then, the electric condition EC is gradually increased depending upon the relation of the work feed speed F and the electric condition shown in the graph of FIG. 15 as the same as the former embodiment. The electric condition EC is stabilized at the point corresponding to F on the graph.

FIG. 13 shows the variation of the electric condition from the thicker part to the thinner part of the workpiece. The broken line shows the condition of sudden change of the thickness of the workpiece to the minimum thickness of the workpiece.

When the electric condition is suddenly decreased, the similar effect can be obtained by controlling the wire feed speed and the wire tension which affect to the wire cut in the work and the oil resistivity as well as the work current and the capacity of the capacitor.

In the above description, a computer is used in all of the embodiments. It is also possible to substitute the computer by the conventional hard ware control device, for example, combining a read-only memory etc. with the data table.

In accordance with the embodiments of the present invention, the electric condition commanded by the computer can be controlled without delay even though the thickness of the workpiece is suddenly changed and accordingly, the trouble of the wire cut can be prevented and the operation in high reliability can be performed without any manual operation.

In the drawings, like reference numerals designate identical or corresponding parts. The computer (6B) shown in FIG. 12 has not the distance computer (18) and the circuit thereof and the electric condition data (16) for the computer (6B) are the condition data corresponding to the variation of thickness. In the other parts, it is the same as the computer (6A) shown in FIG. 10.

We claim:

1. In an electric discharge machine for forming electric discharge between a wire electrode and a work piece in a work liquid by applying a voltage between said electrode and workpiece and performing a desired work by relatively moving said wire electrode and said workpiece, the improvement comprising;
    means for detecting a gap voltage between said wire electrode and said workpiece;
    a first comparator which compares the gap voltage detected by said detected means with the reference voltage to generate a differential signal for the difference in the voltages;
    a converter which receives the output of said comparator to generate a speed signal used for a speed control of the relative movement between said wire electrode and said workpiece; and
    a second comparator which compares a reference speed signal corresponding to the reference work area with the said speed signal, whereby a circuit constant of a power device for applying the voltage between said wire electrode and said workpiece is controllable and when the speed signal as the output of said converter is smaller than a predetermined speed signal, the circuit constant of said power device is controlled to increase through an electric condition control circuit depending upon the output of said second comparator; and when the work area is decreased, it is controlled to decrease the power of said power device whereas when the work area is increased, it is controlled by increase the power of said power device.

2. An electric discharge machine according to claim 1 wherein said electric condition control circuit comprises a memory circuit memorizing plural electric conditions in order of intensities; and said second comparator is connected to said memory circuit and detects a condition that the work of said workpiece is changed from the straight direction to the other direction at the direction change point and the power of said electric power device is decreased to a predetermined power depending upon the electric condition of the memory circuit switched by the output of said second comparator.

3. An electric discharge machine according to claim 2 wherein the condition that the work reaches a direction change point of said workpiece is detected by the variation of the gap voltage.

4. An electric discharge machine according to claim 2 wherein the condition that the work reaches a direction change point of said workpiece is detected by the condition that the speed signal as the output of said converter is over the speed signal corresponding to the work area for the reference.

5. An electric discharge machine according to claim 2 which further comprises a distance computer connected to said memory circuit which starts counting from the direction change point and returns the electric condition of said memory circuit to that of the direction change point after carrying out the work for a predetermined degree.

6. An electric discharge machine according to claim 1 wherein said second comparator, connected to said converter, detects the variation of the thickness of said workpiece.

7. An electric discharge machine according to claim 6 wherein the work current of said power device is increased when the relative speed of said workpiece and said wire electrode is decreased by variation of a thickness detected by said second comparator of said workpiece whereas the work current of said power device is decreased when the relative speed is increased.

8. An electric discharge machine according to claim 6 wherein the work energy is decreased to the work energy for the minimum thickness when said relative speed detected by said converter is increased and then, the work energy is gradually increased.

9. An electric discharge machine according to claim 2 or 6, wherein said gap voltage detected by means for detecting a gap voltage is controlled to be substantially constant.

10. An electric discharge machine according to claim 2 or 6, wherein the relative speed between said electrode and said workpiece detected by said converter is controlled to be substantially constant.

11. An electric discharge machine according to claim 2 or 6, wherein said power device comprises a DC power source; a pulse generator as a circuit element as the base of the circuit constant; a semiconductor switching element which is controlled for ON-OFF control by the output pulse given by said pulse generator; a resistor connected in series to said semiconductor switching element; and a capacitor connected in parallel to said wire electrode. pg,25

12. An electric discharge machine according to claim 2 or 6, wherein the relative movement of said workpiece and said wire electrode is carried out in X-axis direction and Y-axis direction by X-axis and Y-axis motors, respectively and said wire electrode is fed in Z-axis direction.

* * * * *